Oct. 26, 1954  E. F. SCHWELLER ET AL  2,692,429
SLICING AND STORING DEVICE
Filed Nov. 7, 1952  4 Sheets-Sheet 1

INVENTORS.
Edmund F. Schweller
and
James W. Jacobs
BY *Willits, Wardman and Fehr.*
THEIR ATTORNEYS.

INVENTORS.
Edmund F. Schweller
and
James W. Jacobs

Oct. 26, 1954  E. F. SCHWELLER ET AL  2,692,429
SLICING AND STORING DEVICE
Filed Nov. 7, 1952  4 Sheets-Sheet 4
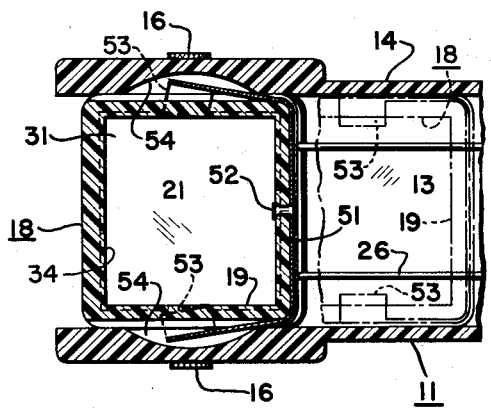
Fig. 6
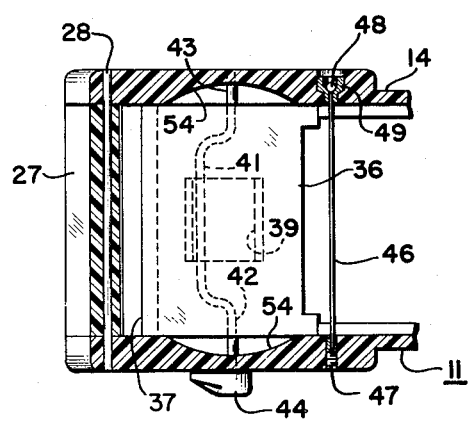
Fig. 5
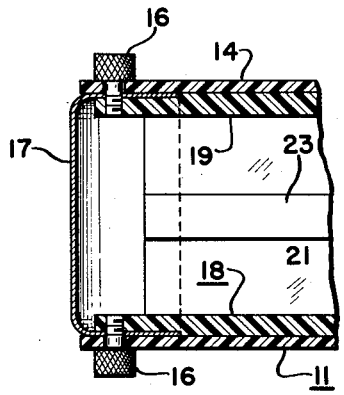
Fig. 7
Fig. 8
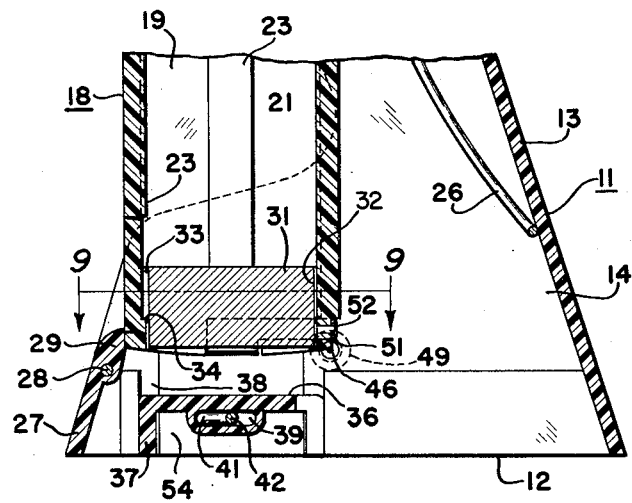
INVENTORS.
Edmund F. Schweller
and
James W. Jacobs
By Willits, Hardman and Fehr.
THEIR ATTORNEYS.

Patented Oct. 26, 1954

2,692,429

UNITED STATES PATENT OFFICE 2,692,429

SLICING AND STORING DEVICE

Edmund F. Schweller, Oakwood, and James W. Jacobs, Dayton, Ohio, assignors to General Motors Corporation, Detroit, Mich., a corporation of Delaware Application November 7, 1952, Serial No. 319,378

2 Claims. (Cl. 31—21)

This invention relates to portable butter or the like storing and slicing devices.

My invention is particularly directed to the provision of a lightweight combined butter storing and slicing device of a vertical pinch type adapted to be placed in the refrigerated food storage compartment of a refrigerator cabinet for preserving the butter and removable from the cabinet for operation to sever and dispense pats or slices of butter therefrom.

An object of my invention is to provide an improved device capable of receiving and storing a one-quarter pound elongated print, bar or stick of butter in an erect position therein whereby when the device is actuated to slice or cut pats from the bar the severed pats can be dispensed out of the bottom of the device so as to eliminate additional handling of the pats in removing them from the device.

Another object of my invention is to provide a portable butter slicing device which can be actuated to cut pats from the bar thereof in the device by one hand of the operator so that the device may be held above and operated to dispense butter pats therefrom directly into or upon food being cooked in receptacles located on top of a cooking range.

In providing a device of the type set forth in the preceding objects it is other and further objects of my invention to render such device adjustable in a novel manner for cutting pats of different thicknesses from the bar of butter therein, to permit opening of the device for reloading a bar of butter therein and to prevent an erect bar of butter in the device from sliding out of the same during a plurality of severing and dispensing operations thereof.

Other objects, advantages and features of the presently disclosed device will become apparent from the following description taken with the accompanying drawings in which:

Figure 5 is a fragmentary sectional view taken on the line 5—5 of Figure 3 showing the mounting of the cutting means in the device and the pivotal mounting of a locking means for the movable member of the device;

Figure 6 is a horizontal sectional view taken on the line 6—6 of Figure 3 showing a means in the device for preventing the bar of butter therein from sliding out of the same;

Figure 7 is a fragmentary vertical sectional view taken on the line 7—7 of Figure 2 showing the pivotal connection between the movable members of the device;

Figure 8 is a fragmentary vertical sectional view showing the position of the weighted butter bar follower block after all pats have been severed from the bar.

Figure 1:
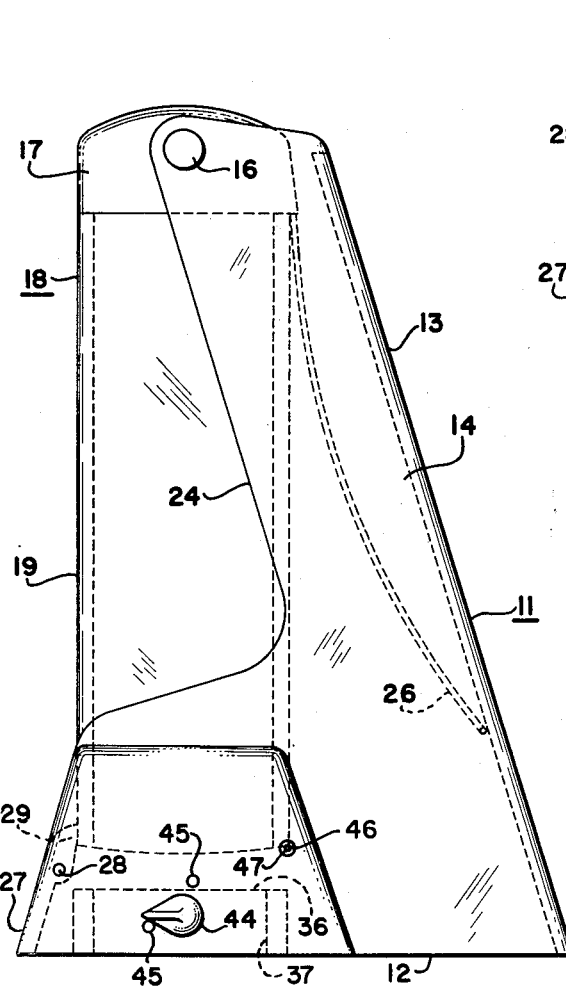
Figure 1 is a side view of a storing and slicing device constructed in accordance with my invention.
Figure 3:
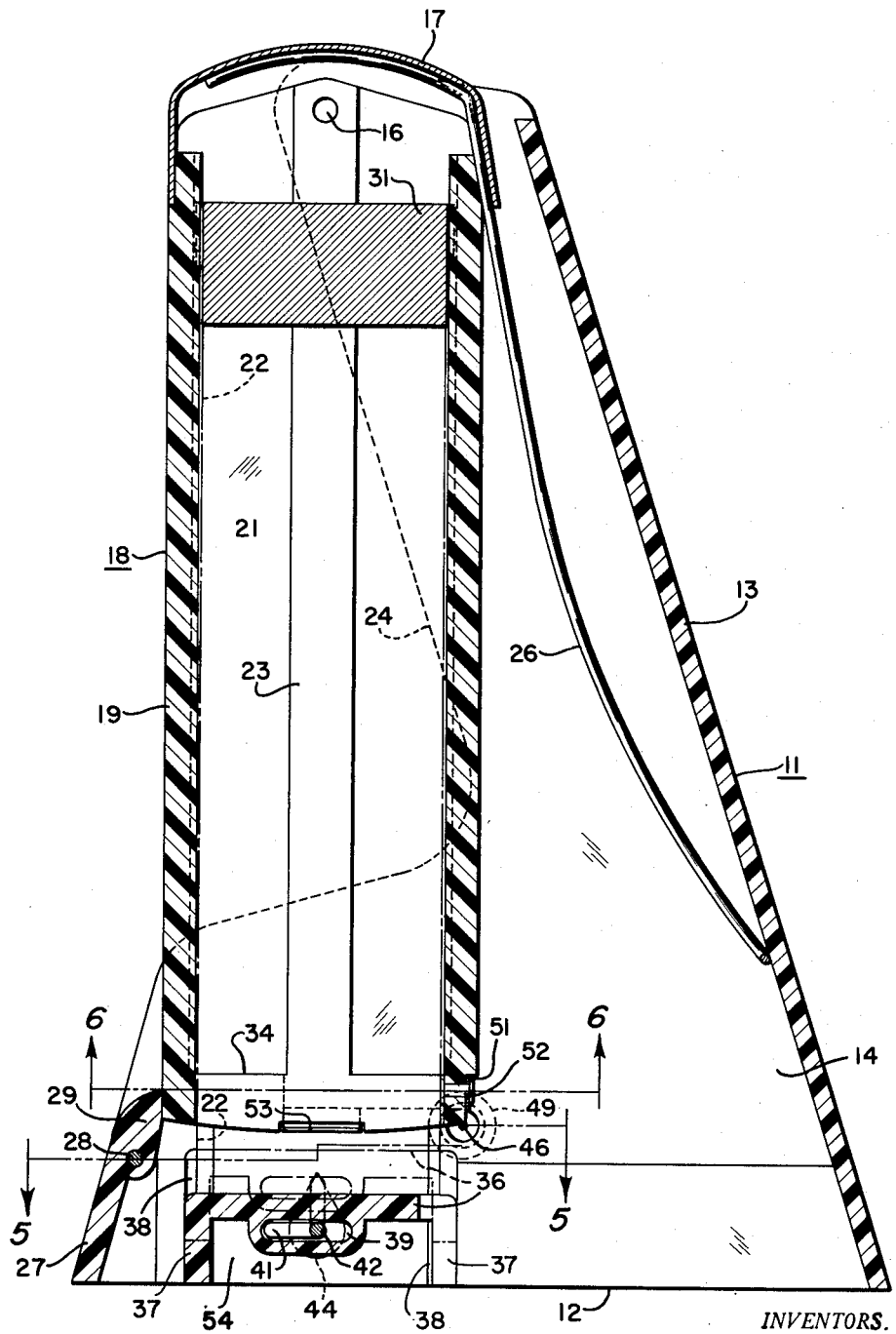
Figure 3 is an enlarged vertical sectional view of the device taken on the line 3—3 of Figure 2 showing the same in a normal loaded position ready to be operated.
Figure 4:
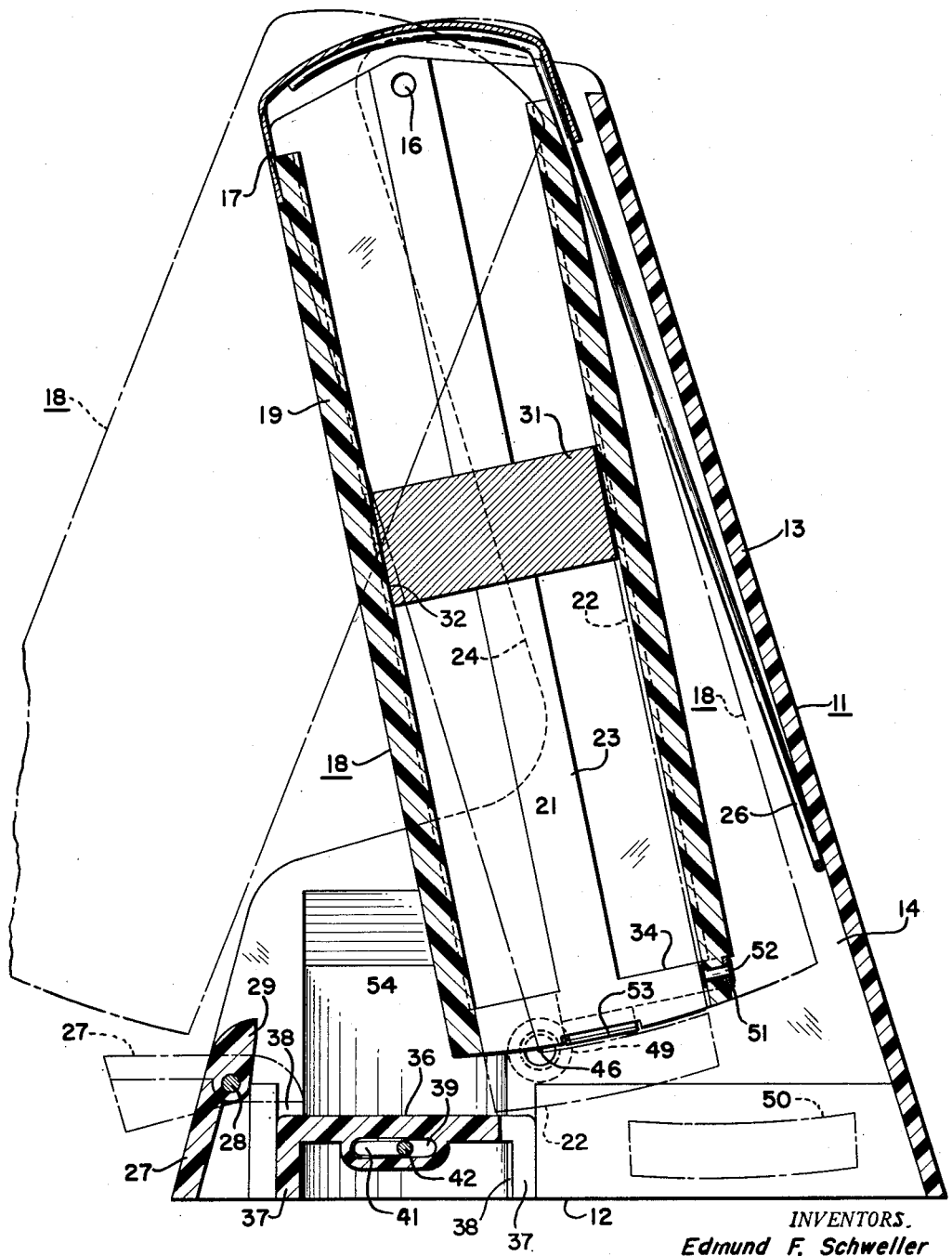
Figure 4 is a view similar to Figure 3 showing one part of the device moved relative to another for slicing a pat of butter from a bar thereof in the device and showing the lower end of the butter carrying member swung outwardly of the upright housing member thereof.

Referring to the drawings, for illustrating the invention, I show in Figure 1 thereof a combined butter storing and slicing device of the pinch actuatable type which is normally placed in a refrigerated food storage compartment of a refrigerator cabinet for preserving the butter and which may be removable from the cabinet for operation to dispense butter pats therefrom. The present device comprises a substantially hollow upright housing member, generally represented by the reference character 11, having a flat open bottomed base portion 12 for supporting the device in a vertical position on a table top and/or on a shelf within a refrigerator cabinet. This member 11 has a rear wall 13 extending angularly upward, upright side walls 14 and is open at the front of the device intermediate the side walls 14. A vertically elongated rectangular member, generally represented by the reference character 18, has a metal cap 17 fitted over and closing its upper end which is pivotally connected by suitable thumb screws or the like 16 (see Figure 7), to the upper or top portion of the side walls 14 of member 11. The elongated member 18 includes four walls 19 forming a substantially vertical compartment 21 open at its lower end and adapted to receive and enclose a bar, print or stick of butter. This bar of butter is indicated by the dot-dash lines 22 in the drawings. Butter receiving compartment 21, of member 18, is substantially square in horizontal cross section and each of its walls 19 is provided with an inwardly directed centrally located boss 23 extending in a straight line direction along the length of the compartment. These bosses 23 space the major part of outer surfaces of butter bar 22 from the inner surface of walls 19 so as to lessen the likelihood of the butter bar sticking to these walls. The bar of butter 22 placed in the device, in a manner to hereinafter be described is approximately 1¼" high, 1¼" wide and 4⅝" long. The front edge of each side wall 14 of member 11 is cut back, as shown at 24 in Figures 1 and 3 of the drawings, so as to provide a clearance to permit the back wall 13 of member 11 to be grasped by the palm of an operator's hand while the fingers of this same hand may grasp member 18 to move this member, about the pivotal connection (screws 16) between the members 11 and 18, toward the rear wall 13 of member 11 for a purpose to be hereinafter described. A substantially U-shaped wire or the like spring 26 has its ends anchored between members 17 and 18 at the top thereof, in any suitable or conventional manner, and has its closed end engaging a lower portion of member 13 to normally bias the same in a direction tending to swing member 18 outwardly of member 11. Thus in order to retain the butter compartment storing and enclosing member 18 in an operative position within housing member 11 of the device I provide a locking means therefore. This locking means is preferably operable to permit the lower open end of elongated member 18 to be swung out of the housing member 11 so as to load a bar of butter 22 into the compartment 21 as shown by the dot-dash lines in Figure 4 of the drawings. The locking means in the present disclosure is in the form of a small door 27 pivotally mounted, as by a pin 28, to the front portion of side walls 14 of member 11 near the base part 12 thereof for vertical swinging movement relative thereto. That part of door 27 above the pivot pin 28 forms a lip 29 which is normally engaged by the lower edge portion of the front wall 19 of member 18 to force the lower part of door 27 into engagement with a stop means or shoulder on walls 14 of member 11. Since it is desirable to at all times view the contents of the device from exteriorly thereof I prefer to form at least members 11 and 18 thereof from a transparent material. For this reason members 11 and 18 or at least parts thereof in the present device are fabricated either from a molded thermoplastic acrylic (methyl-methacrylate) resin material or from polystyrene.

Figure 2:
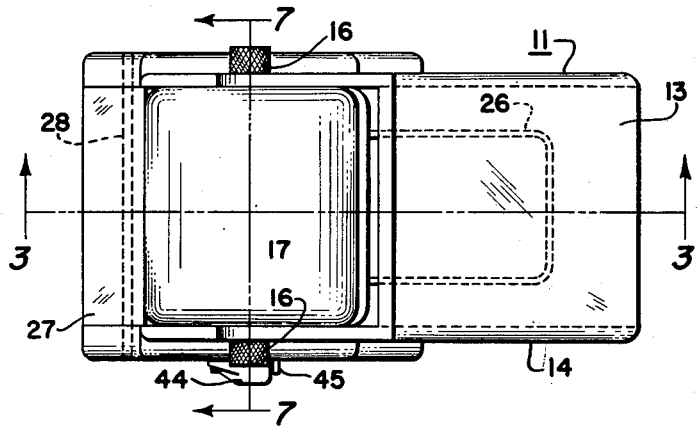
Figure 2 is a top view of the device shown in Figure 1.
Figure 9:
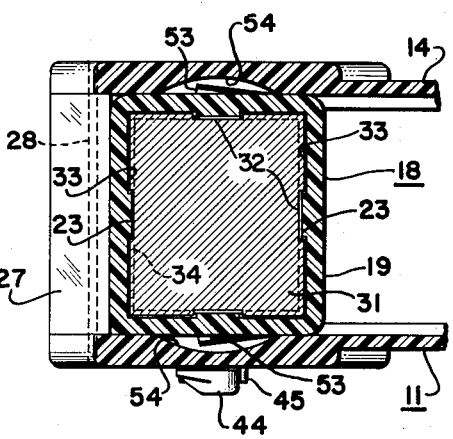
Figure 9 is a sectional view taken on the line 9—9 of Figure 8 showing guide means for the butter bar weight block.

A follower block 31 is disposed in compartment 21 and is adapted to rest on the upper end of the butter bar 22 therein to add weight thereto, particularly after a substantial number of pats have been severed therefrom, to insure sliding of the bar 22 downwardly in member 18. Block 31 is cut or notched out as at 32 (see Figure 9) to fit over the straight bosses 23, extending inwardly of walls 19 of compartment 21 along the length thereof, and to provide ears 33 on the block which extend beyond the bosses 23 toward the walls 19. This block 31 may be constructed of any suitable material capable of adding the desired amount of weight upon the vertically disposed butter bar 22. In order to prevent block 31 from passing downwardly beyond the lower open end of elongated member 18 this member is provided with a rim or collar 34 about the lower edge portion thereof. This rim or collar 34 projects inwardly of the inner surface of walls 19 the same distance of inward projection as the bosses 23 (see Figures 6 and 9). The lower portion of side walls of block 31 is cut away to clear the rim or collar 34 whereby the bottom of ears 33 thereon engage the shoulder formed by the rim or collar 34, after the entire bar 22 has been sliced or severed into pats, to thus hold the bottom of block 31 substantially flush with the open bottom end of member 18.

A platform 36, having guiding legs 37 disposed in vertical grooves 38 formed in the lower portion of side walls 14 of housing member 11, is located below the open end of vertically elongated member 18 for receiving the lower end of the bar of butter 22 and for supporting the same in an erect position in the device. Butter bar supporting platform 36 has walls forming a horizontally elongated hole 39 therein below the top butter bar supporting surface thereof. This hole 39 receives a straight portion of a bent or offset part 41 of a crankshaft-like rod 42 having its ends 43 pivotally mounted in suitable openings provided therefore in side walls 14 of the housing member 11. One end 43 of rod 42 extends outwardly of the device through a wall 14 of member 11 and has a lever 44 secured thereto for rotating the rod. The hole 39, bent rod 42 and lever 44 cooperate with one another to provide means for adjusting the platform up and down or vertically relative to housing member 11 and particularly to the open lower end of member 18 for varying the thickness of pats of butter to be severed and dispensed from the device. Suitable bosses 45 may be provided on the exterior surface of wall 14 of member 11 to form stops for the swinging movement of lever 44 (see Figure 1). The rod 42 and lever 44 may have sufficient frictional engagement with walls 14 of member 11 to hold platform 36 in any one of a plurality of adjusted positions intermediate the fully raised or lowered position thereof to thereby permit various thickness pats to be cut by and dispensed from the present device.

A cutting means is provided in the device and rendered effective by movement of member 18 relative to member 11 for slicing or severing pats from the bar of butter 22 therein. This cutting means includes a wire 46 extending across the device intermediate the side walls 14 of member 11. Wire 46 is disposed above platform 36 and located slightly below and adjacent to the inner side of member 18 or the inner side of the open end of compartment 21. One end of wire 46 is soldered or otherwise suitably secured to a set or the like screw 47 which is threaded into a tapped hole provided in one of the side walls 14 of member 11 (see Figure 5). The other end of wire 46 is soldered or secured in any suitable manner to a ball 48 located and freely rotatable in a countersunk cavity provided in a bushing 49 disposed in an opening in the other or opposed side wall 14 of member 11. The tension of wire cutter 46 may be regulated, as desired or as may become necessary, by rotating the screw 47 into and/or out of its tapped hole mounting.

I provide a means rendered effective automatically by movement of member 18 relative to member 11 for preventing a bar of butter 22 within the device from sliding out of same during the act of moving the bar off its supporting platform 36 while substantially simultaneously slicing or severing a pat from the bar. This means in the present disclosure includes a U-shaped flat metal spring 51 attached to the lower end portion of member 18 as by a rivet or the like 52 (see Figures 3 and 6). The end portion of each vertically disposed leg of U-shaped spring element 51 is provided with an integral horizontally extending wing 53. These opposed wings 53 are disposed at the open end of compartment 21 and normally lie beyond the walls thereof within cutout portions 54 provided in the side walls 14 of member 11 (see Figure 6) so as not to interfere with sliding movement of bar 22 downwardly within compartment 21 into engagement with the platform 36. However, when member 18 is moved relative to and into member 11 the legs of spring 51 engage and slide over a shoulder at one side of the cutout portions 54, on the side walls 14 of housing 11, to cam the opposed wings 53 inwardly toward one another below the butter bar 22 to thereby hold the bar during its movement over the open bottom end of the member 11 adjacent platform 36 (see Figures 4 and 6). The legs of element 51 will again spring into the cutout portions 54, as shown in Figure 6 of the drawings, when the butter bar container or member 18 is swung back to its normal position of vertical alignment with platform 36 to permit the bar 22 to slide downwardly within compartment 21 into supporting engagement with the platform.

In preparing the present device for use to store a bar of butter therein and/or to operate the same to cut pats from the bar, door 27 is moved vertically about its pivot pin 28 to cause its upper lip 29 to shift inwardly of the device past and beneath the lower end of elongated member 18. The butter carrying member 18 can then be swung outwardly of housing member 11 (see Figure 4) to permit a butter bar 22 to be inserted into the compartment 21 thereof. It is to be understood that the weighted block 31, at the time of inserting the bar of butter 22 into compartment 21, is positioned in the bottom of compartment 21 with its shoulder, adjacent the cut away part 34, engaging the shoulder of collar or rim 33. This block 31 will, upon inserting the bar 22, be slid upwardly within compartment 21 so as to rest upon the upper end of the bar. After loading or reloading the device as described, member 18, with the bar of butter 22 therein, is pushed back into housing member 11 beyond the lip 29 on door 27 whereupon lip 29 then engages the lower front edge of member 18 to prevent spring 26 from moving member 11 outwardly of the device until the door 27 is again moved. This vertically aligns member 18 with platform 36 and as the operator's fingers are released from bar 22, during the act of moving member 38 back into housing member 11, the bar of butter slides downwardly in compartment 21 out of the open bottom end of member 18 and into engagement with the platform 36. The device is now readied to be placed and supported by base portion 12 thereof on a shelf in the food storage compartment of a refrigerator cabinet for cooling and preserving the butter or is ready to be manipulated to slice or cut pats from the butter bar 22. If a pat or pats are now desired to be cut and dispensed from the device the platform 36 is first raised or lowered, thus raising or lowering the bar 22 within compartment 21, to determine the approximate thickness of pats to be sliced by and harvested from the device. Adjustment of platform 36 is accomplished by turning the hand lever 44 which causes the cam part 41 of rod 42 to bear against one of the walls of the horizontally elongated hole 39 and move the legs 37 of the platform along the guide grooves 38. The operator now grasps the upright housing member 11 with the palm of the hand and grasps the exposed wall 19 of member 18 with the fingers of this same hand in the vicinity of the cut back front edge portion 24 on side walls 14 of member 11. A squeezing motion of the fingers toward the palm of the hand by the operator will swing member 18, against the force exerted by spring 26, toward the back wall 13 of member 11 to thereby slide the butter bar 22 off platform 36 and cause member 18 to swing over and past the cutting wire 46. This swinging movement forces the wire 46 through the bar 22 to cut a pat 50 therefrom (see the dot-dash showing in Figure 4 of the drawings) and to cause the severed pat 50 to be dispensed from the device through the open bottom in the base 12 of member 11 adjacent platform 36. The severed and dispensed pat 50 may fall upon a butter receiving tray or dish or it may be dispensed directly from the device into a cooking receptacle on top of a cooking range. This operation has caused the legs of spring 51 to be cammed inwardly toward one another so as to move the wings 53 thereon over the lower end of bar 22 substantially at the severing point of the bar to prevent the butter bar from sliding out of member 18 and consequently housing 11 of the device while cutting and dispensing the pat therefrom.

As soon as the hand of the operator is removed from the device the force of spring 26, disposed between members 11 and 18, will swing member 18 and butter bar 22 therein back to their normal position in vertical alignment with the platform 36. During this return movement of member 18 wings 53 on the legs of spring element 51 will move outwardly away from the lower end of bar 22 and thereafter weight block 31 will cause the bar of butter to shift downwardly in compartment 21 until its lower end engages and is again supported on platform 36. The device may now be returned to the refrigerator cabinet or it may be actuated, as above described, several times in succession to harvest additional pats of butter therefrom as may be desired. After the entire bar 22 has been cut into pats weight block 31 will rest in the bottom of compartment 21 (see Figure 8) and door 27 may be opened (see Figure 4) to permit member 18 to be swung outwardly of the device, as hereinbefore described, to again load another butter bar 22 into the compartment 21. The thumb screws 16 pass through suitable holes provided in member 11 and metal cap 17 and are threaded into tapped holes provided in the upper portion of member 18 (see Figure 7). If it is desired to wash or clean out the butter compartment 21, prior to reloading another butter bar thereinto, the screws 16 may be threaded out of the tapped holes in member 18 to permit this member to be detached from housing member 11 whereupon it can be washed and cleaned with hot water.

It should be apparent from the foregoing that I have provided an improved combined butter storing and slicing device of the vertical one-hand squeezable type. By providing for adjustment of the platform upon which the bar of butter is supported the thickness of pats severed by and dispensed from my improved device can be varied. Also by relieving the friction between the erect bar of butter and walls of its enclosing compartment the butter bar readily slides downwardly in this compartment upon its supporting platform to eliminate its sticking to such walls. My improved device can be readily opened for reloading purposes and parts thereof can be quickly disassembled to permit cleansing the same.

While the form of embodiment of the invention as herein disclosed constitutes a preferred form, it is to be understood that other forms might be adopted, as may come within the scope of the claims which follow.

What is claimed is as follows:

1. A portable storing and slicing device comprising, a housing member having a substantially flat bottomed base portion for supporting said device in an upright position on a table top or the like, an elongated member within said housing member pivotally connected adjacent the top thereof, said elongated member having a compartment therein for receiving and enclosing a bar of butter, the lower end of said compartment being open, a movable platform in the base portion of said housing member spaced from the open lower end of said compartment and directly supporting the bar in said device, said members being movable relative to one another about the pivotal connection therebetween, cutting means on said housing member above said platform and located adjacent one side of the lower open end of said compartment, the movement of said members relative to one another swinging the lower end of said elongated member over and past said cutting means to force same through the bar to sever a pat therefrom, and said platform being adjustable toward and/or away from the open lower end of said compartment to vary the thickness of a pat to be severed from the bar.

2. A portable storing and slicing device comprising, a housing member having a substantially flat bottomed base portion for supporting said device in an upright position on a table top or the like, an elongated member within said housing member pivotally connected adjacent the top thereof, said elongated member having a compartment therein for receiving and enclosing a bar of butter, the lower end of said compartment being open, means extending along and projecting inwardly from walls of said compartment for spacing the major part of surfaces of the butter bar therefrom, a movable platform in the base portion of said housing member spaced from the open lower end of said compartment and directly supporting the bar in said device, said members being movable relative to one another about the pivotal connection therebetween, a wire cutter on said housing member above said platform extending across one side of the lower open end of said compartment, the movement of said members relative to one another swinging the lower end of said elongated member over and past said wire cutter to force same through the bar to sever a pat therefrom, and said platform being adjustable from the exterior of said housing member toward and/or away from the open lower end of said compartment to vary the thickness of a pat to be severed from the bar.

References Cited in the file of this patent

UNITED STATES PATENTS

| Number | Name | Date |
|---|---|---|
| 656,745 | Mivelaz | Aug. 28, 1900 |
| 1,334,304 | Hodgdon et al. | Mar. 23, 1920 |
| 1,693,480 | Gonyk | Nov. 27, 1928 |
| 2,297,075 | Rowland | Sept. 29, 1942 |
| 2,603,868 | Young et al. | July 22, 1952 |

FOREIGN PATENTS

| Number | Country | Date |
|---|---|---|
| 245,249 | Great Britain | Jan. 7, 1926 |